United States Patent
Fleming et al.

(10) Patent No.: US 8,805,717 B2
(45) Date of Patent: Aug. 12, 2014

(54) METHOD AND SYSTEM FOR IMPROVING PERFORMANCE OF CUSTOMER SERVICE REPRESENTATIVES

(75) Inventors: Jay Fleming, Doylestown, PA (US); Lorraine Kulik-Bender, Perkasie, PA (US); Norine McDevitt, Collegeville, PA (US); Nancy Dales, Doylestown, PA (US); Ann Graziano, Jamison, PA (US)

(73) Assignee: Hartford Fire Insurance Company, Hartford, CT (US)

( * ) Notice: Subject to any disclaimer, the term of this patent is extended or adjusted under 35 U.S.C. 154(b) by 2287 days.

(21) Appl. No.: 11/210,944

(22) Filed: Aug. 24, 2005

(65) Prior Publication Data

US 2006/0047566 A1 Mar. 2, 2006

Related U.S. Application Data

(60) Provisional application No. 60/605,883, filed on Aug. 31, 2004.

(51) Int. Cl.
| | |
|---|---|
| *G06Q 10/00* | (2012.01) |
| *G06Q 30/02* | (2012.01) |
| *G06Q 10/06* | (2012.01) |
| *G06Q 10/10* | (2012.01) |

(52) U.S. Cl.
CPC ............. *G06Q 10/10* (2013.01); *G06Q 30/02* (2013.01); *G06Q 10/06398* (2013.01); *G06Q 10/06395* (2013.01); *G06Q 10/06375* (2013.01)
USPC .......................... 705/7.42; 705/304; 705/7.38

(58) Field of Classification Search
None
See application file for complete search history.

(56) References Cited

U.S. PATENT DOCUMENTS

| | | | |
|---|---|---|---|
| 5,185,780 A | 2/1993 | Leggett | |
| 5,299,260 A * | 3/1994 | Shaio | 379/266.07 |
| 5,940,813 A * | 8/1999 | Hutchings | 705/43 |
| 5,946,375 A * | 8/1999 | Pattison et al. | 379/112.01 |
| 6,049,779 A * | 4/2000 | Berkson | 705/14.39 |
| 6,055,511 A | 4/2000 | Luebbering et al. | |
| 6,058,163 A * | 5/2000 | Pattison et al. | 379/265.06 |
| 6,324,282 B1 * | 11/2001 | McIllwaine et al. | 379/265.06 |
| 6,347,139 B1 * | 2/2002 | Fisher et al. | 379/265.12 |
| 6,389,400 B1 * | 5/2002 | Bushey et al. | 705/7 |
| 6,424,709 B1 * | 7/2002 | Doyle et al. | 379/265.02 |
| 6,459,787 B2 * | 10/2002 | McIllwaine et al. | 379/265.06 |

(Continued)

OTHER PUBLICATIONS

Is It Worth It to Win the Talent War? Evaluating the Utility of Performance-Based Pay Michael C Sturman, Charlie O Trevor, John W Boudreau, Barry Gerhart. Personnel Psychology. Durham: Winter 2003. vol. 56, Iss. 4; p. 997.*

(Continued)

*Primary Examiner* — Gurkanwaljit Singh
(74) *Attorney, Agent, or Firm* — Howard IP Law Group, PC

(57) ABSTRACT

The computer method for managing performance of a customer service representative comprising: establishing a target performance grade, collecting a set of quantitative data generated as a result of customer contact; collecting a set of qualitative data input characterizing service representative performance; generating a performance grade based on the sets of quantitative and qualitative data; and determining if the target performance grade has been met; and if the performance grade has been met, paying the service representative based upon said successful performance grade and if the performance grade has not been met, then paying displaying a the performance grade.

34 Claims, 6 Drawing Sheets

(56) References Cited

U.S. PATENT DOCUMENTS

| | | |
|---|---|---|
| 6,473,737 B2 | 10/2002 | Burke |
| 6,513,018 B1 | 1/2003 | Culhane |
| 6,604,084 B1 | 8/2003 | Powers et al. |
| 6,628,755 B2 | 9/2003 | Shimada et al. |
| 6,628,763 B1 | 9/2003 | Mani |
| 6,628,777 B1 | 9/2003 | McIllwaine et al. |
| 6,631,133 B1 | 10/2003 | Christie et al. |
| 6,631,402 B1 | 10/2003 | Devine et al. |
| 6,633,539 B1 | 10/2003 | Basso et al. |
| 6,633,640 B1 | 10/2003 | Cohen et al. |
| 6,633,742 B1 | 10/2003 | Turner et al. |
| 6,633,859 B1 | 10/2003 | Farlow et al. |
| 6,766,012 B1* | 7/2004 | Crossley ................ 379/265.02 |
| 6,877,034 B1* | 4/2005 | Machin et al. ................ 709/223 |
| 6,922,466 B1 | 7/2005 | Peterson et al. |
| 6,925,165 B2 | 8/2005 | Cohen et al. |
| 6,938,048 B1* | 8/2005 | Jilk et al. ................ 707/102 |
| 7,023,979 B1* | 4/2006 | Wu et al. ................ 379/265.11 |
| 7,110,525 B1* | 9/2006 | Heller et al. ............. 379/265.11 |
| 7,158,628 B2* | 1/2007 | McConnell et al. ..... 379/265.02 |
| 7,174,010 B2* | 2/2007 | McIlwaine et al. ...... 379/265.01 |
| 2001/0032120 A1* | 10/2001 | Stuart et al. .................... 705/11 |
| 2002/0060988 A1* | 5/2002 | Shtivelman ................. 370/259 |
| 2002/0133386 A1* | 9/2002 | Chishti et al. .................... 705/8 |
| 2002/0147632 A1* | 10/2002 | Winham et al. ................. 705/11 |
| 2003/0086555 A1* | 5/2003 | McIlwaine et al. ...... 379/265.02 |
| 2003/0172013 A1* | 9/2003 | Block et al. .................... 705/33 |
| 2004/0102982 A1* | 5/2004 | Reid et al. ..................... 705/1 |
| 2004/0138944 A1 | 7/2004 | Whitacre et al. |
| 2004/0210159 A1* | 10/2004 | Kibar ............................ 600/558 |
| 2006/0041487 A1* | 2/2006 | Santalo et al. .................. 705/30 |

OTHER PUBLICATIONS

Merit Pay and Organizational Performance: Is There an Effect on the Bottom Line? Richard E Kopelman; Janet L Rovenpor; Mo Cayer National Productivity Review (1986-1998); Summer 1991; 10, 3; ABI/INFORM Global p. 299.*

Gregory K. Adkins "Teacher Performance Pay: The Perceptions of Certified School-Based Personnel" Thesis Dissertation (Fall Term 2004) University of Central Florida.*

A New Management Style Kent, Judith P. Mortgage Banking; Sep. 1991; 51, 12; ABI/INFORM Global p. 43.*

The development of salary goal modeling: From regression analysis to a value-Based prescriptive approach Stewart, Kenneth D; Dalton, Margaret M; Dino, Geri A; Wilkinson, Steven P The Journal of Higher Education; Sep./Oct. 1996; 67, 5; Research Library p. 555.*

The HAY system of compensation Craig Skenes; Brian H Kleiner Management Research News; 2003; 26, 2-4; ABI/INFORM Global p. 109.*

Morgan, Jonathan Quentin. The Role of Regional Industry Clusters in Urban Economic Development: An Analysis of Process and Performance.*

Using Performance Measurement to Evaluate Strategic Human Resource Management Decisions: Kodak's Experience with Profit Sharing John W Boudreau; Robert Berman; Human Resource Management (1986-1998); Fall 1991; 30, 3; ABI/INFORM Global p. 393.*

* cited by examiner

| QUALITY SCORES | AHT RANGES | | |
| --- | --- | --- | --- |
| | 5.20 - 5.05 | 5.04 - 4.80 | <4.80 |
| 91.0% - 93.0% | $50 | $75 | $100 |
| 93.1% - 95.0% | $75 | $100 | $150 |
| > 95.0% | $100 | $150 | $200 |

*Fig. 3*

METHOD AND SYSTEM FOR IMPROVING PERFORMANCE OF CUSTOMER SERVICE REPRESENTATIVES

CROSS-REFERENCE TO RELATED APPLICATIONS

The present application claims priority to U.S. Provisional Patent Application No. 60/605,883 filed Aug. 31, 2004, the entire disclosure of which is hereby incorporated by reference herein.

FIELD OF THE INVENTION

This application is generally related to the field of computer-based devices and methods, and more particularly to devices and methods for evaluating and improving customer service agent's performance by analyzing performance attributes in meeting optimum metric targets to achieve incentive payouts.

BACKGROUND OF THE INVENTION

In call center environments the accurate and timely evaluations of performance is important for servicing the customer and motivating service representatives. While this is generally true for all industries and services, customer service providers have a particular need for a comprehensive approach to agent evaluation and creating incentive systems to improve efficiencies, because each customer contact with an agent affects sales and more generally the goodwill of a business. Few call center management systems actually measure performance by utilizing attributes that translate directly from performance to incentives. Partly this is due to the difficulty of managing a process objectively where the achievement of objectives are often subjective (e.g., how many customers were satisfied or how communication resulted in later business, etc.). Consequently, a significant need exists for an approach to performance management that is suitable for motivating agents who provide customer service. Furthermore, the approach should be measurable in terms of call times, quality of conversation, and primary skill sets that are additionally achievable, reliable and cost effective.

The methods of the present invention focus on improving customer service representatives performance, as it relates to production and quality, thereby improving a business unit's results. This method has direct connection to an individual's performance expectations and provides for the opportunity to pay out incentive(s) on a regular and consistent basis to those individuals not typically compensated through commission-based incentives.

SUMMARY OF THE INVENTION

The present invention includes a computer method for managing performance of a customer service representative by establishing target performances; collecting data resulting from customer contact; generating a performance grade based on the data; and determining if the target performance grade had been met; and, if the performance grade had been met, paying the representative accordingly, and if the performance grade had not been met, then displaying the performance grade achieved.

The method of the present invention determines the activities and communication attributes that affect performance in a call center environment. The attributes or factors that are essential to efficiency, profitability and quality are used in algorithms to establish the optimum performance target metrics to which an individual should aspire to qualify for an incentive award. The method also includes determining the payout amounts applied to those targets. The process also includes collecting and calculating the metrics by individual and later pooling to generate a combined metric for applying a target payout.

In one embodiment, individuals need to meet specific administrative eligibility criteria to qualify for the program to receive the incentive payout. However, every regeneration in the program is generally measured against average call handling time, a call quality score and primary call skill set representing particular performance attributes.

Yet another embodiment of the invention is a process for changing performance attribute target metrics or modifying payout amounts as business requirements change or as feedback from internal or external business and financial criteria dictate.

In another embodiment, the process framework includes a method for adding additional performance attributes for determining target metrics to be used in the evaluation process as business requirements change.

BRIEF DESCRIPTION OF THE DRAWINGS

It is to be understood that the drawings are solely for purposes of illustrating the concepts of the invention and are not intended as a definition of the limits of the invention. The embodiments shown in the figures and described in the accompanying detailed description are to be used as illustrative embodiments and should not be construed as the only manner of practicing the invention. Also, the same reference numerals, possibly supplemented with reference characters where appropriate, have been used to identify similar elements.

FIG. 3 illustrates a simplified incentive payout grid.

DETAILED DESCRIPTION

In the figures to be discussed, the circuits and associated blocks and arrows represent functions of the process according to the present invention, which may be implemented as electrical circuits and associated wires or data busses, which transport electrical signals. Alternatively, one or more associated arrows may represent communication (e.g., data flow) between software routines, particularly when the present method or apparatus of the present invention is a digital process.

The invention pertains to a method for providing an incentive pay for customer service representatives that is directly tied to individual performance and provides for the incentive payouts on a regular and consistent basis, ultimately having the effect of improving performance related to efficiency and quality. The method includes a computer process for determining significant identified attributes that affect customer service representative performance in a call center environment. Once the salient attributes are determined, they are used as standards or targets, the meeting of which results in an incentive payout. The process includes collecting and calculating combinations of metrics, and thereafter pooling the combination of metrics into a target payout grid. Individuals thereafter need to meet the target on a payout grid, as well as meet specific administrative eligibility criteria, to receive the payout. The average call handling time, call quality score, and primary call skill set are among the attributes that apply. In addition to the identified attributes, the process may add attributes, change targets, or modify eligibility criteria as the requirements of the call center change.

Figure 1:
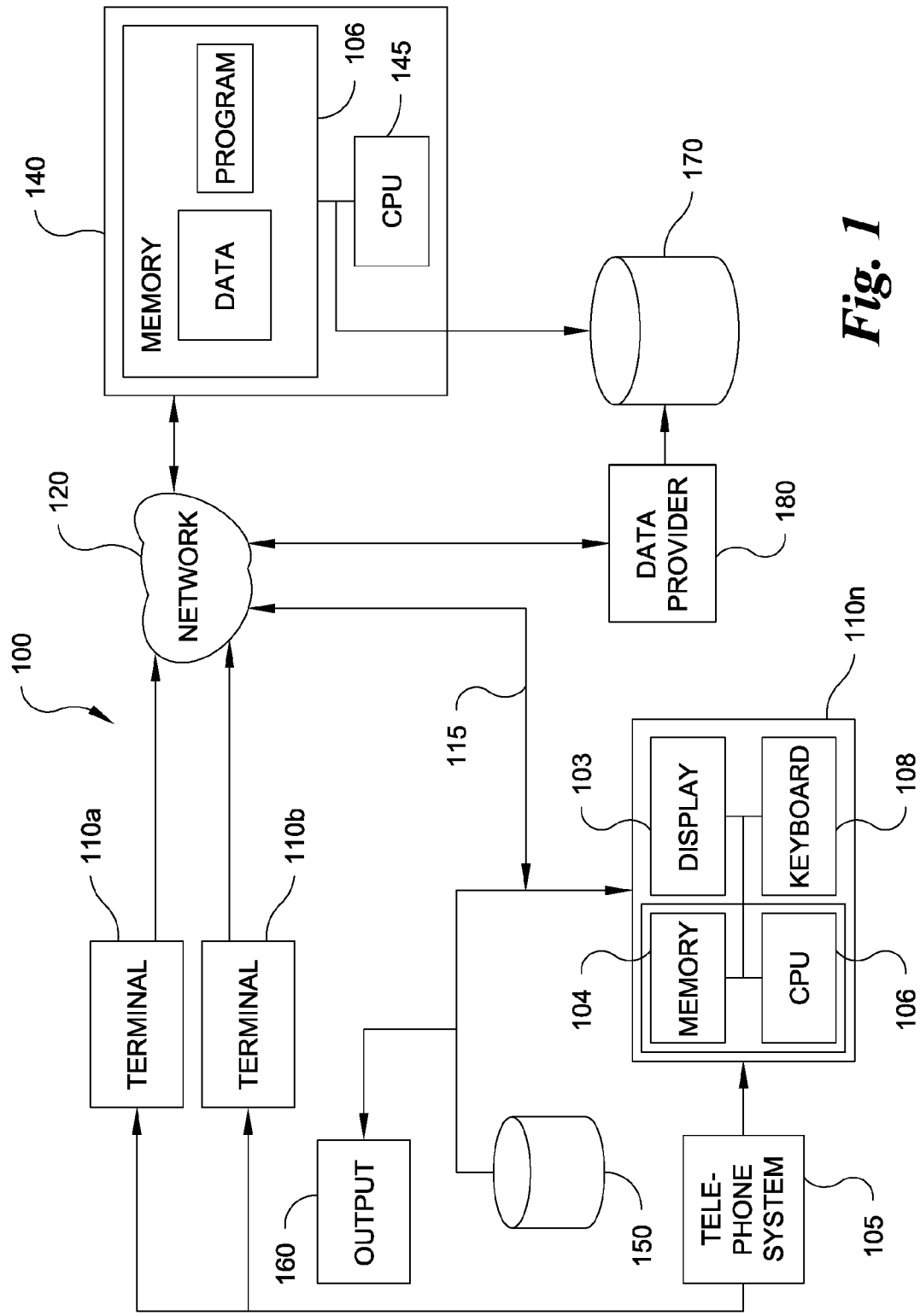
FIG. 1 illustrates a computer system for processing an incentive based method for customer service representatives.

It will be understood by those skilled in the art of computer programming that FIG. 1, illustrates an exemplary embodiment of a system 100 that may be used for implementing the principles of the present invention. In general, the system includes a local area network of terminals or workstations, telephone and telephone interfaces, database file servers, input devices and output devices configured by software for accumulating, processing, administering and analyzing attributes in an automated workflow environment. The system provides for on-line servicing of a call center, as well as the means through which the attributes are selected, for customer service representative performance measurement and calculating whether an incentive payout is due. The system also provides for publication of the quantitative effects of attributes, changes in standards or targets, or modification of eligibility criteria as the requirements of the call center change, and specification of a range of variables related to attributes stored in the database file servers.

System 100 includes one or more terminals 110a-110n, each having a corresponding CPU, such as CPU 106, which includes a display 103 and memory 104. The terminals are typically connected to a telephone system 105 for receipt of incoming calls. The terminals 110a-110n are used for servicing the customer and for managing, collecting and calculating a combination of performance metrics for individual customer service representatives. In addition, a database means 150 is interconnected to the terminals 110a-110n for storing information related to the business of the call center as well as information related more specifically to whether a customer service representative is entitled to an incentive payout. The system in FIG. 1 also includes an output means 160 for producing documents in at least one of text, graphics, and electronic transfer mode, said output means being interconnected and responsive to each of said plurality of terminal means, such as terminal means 110n; and, a corresponding input means 108 for receiving predetermined input into said CPU 106; and, a software means (unshown) for configuring each of said plurality of terminals 110a-110n.

Output means 160 represents one or more devices, such as facsimile machines, photocopiers, etc., that have access to customer files, and files related to the incentive payout process, which may be stored on database 150. Input source 115 also communicates with one or more network connections for receiving data from a server 140 over network 120, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

Other servers 140, may be in communication with network 120 or may be in direct communication with terminals 110a-110n. Server 140 and terminals 110a-110n are in communication with database means 170 to obtain attribute, payout or performance information, to store information related to collecting and calculating a combination of metrics on an individual basis and for any suitable purpose in improving the performance of the call center individual.

In addition to databases, such as database means 150 and a remote data base means 170, data may be provided from a data provider 180.

In a preferred embodiment, computer readable code executed by CPU 106, as processing relates to terminal 110n, may implement coding and decoding employing the principles of the present invention. Correspondingly, computer readable code executed by server 140, as processing relates to CPU 145, may implement coding and decoding employing the principles of the present invention. In other embodiments, hardware circuitry may be used in place of, or in combination with, software instructions to implement the invention. For example, the elements illustrated herein may also be implemented as discrete hardware elements. As would be appreciated, terminals 110a-110n and server 140 may be embodied in such means as a general purpose or special purpose computing system, or may be a hardware configuration, such as a dedicated logic circuit, integrated circuit, Programmable Array Logic (PAL) or Application Specific Integrated Circuit (ASIC), that provides known outputs in response to known inputs.

Figure 2A:
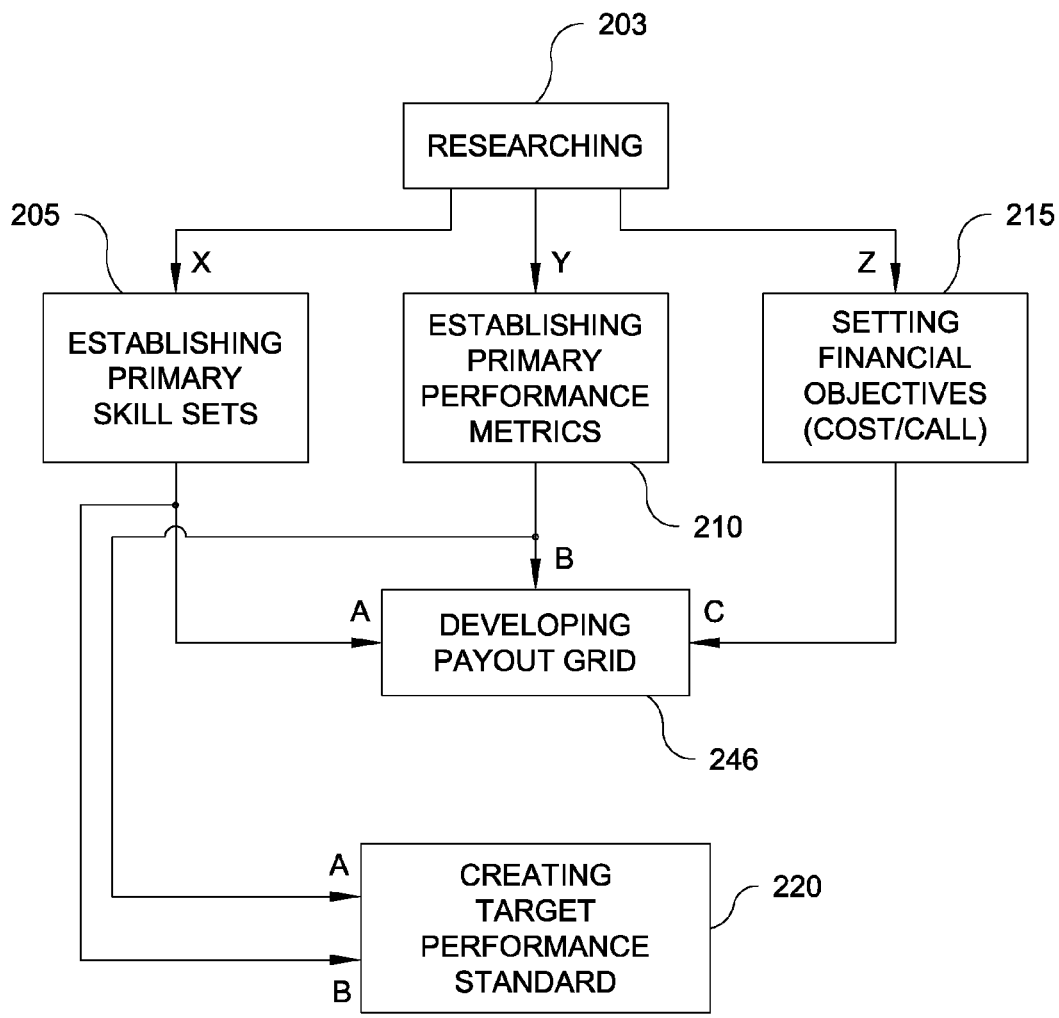
FIG. 2a illustrates a flow diagram of the process for populating the incentive payout grid and creating the target performance standard.

FIG. 2a is a block diagram for creating 220 a target performance standard of the elements of the present invention and for populating an incentive payout grid 300 as is illustrated in FIG. 3. The computer method for managing performance of a customer service representative includes the steps of researching 203 the performance factors that most influence the success of a call center.

The process, such as indicated in steps 205, 210 and 215, proceeds from research analysis performed in step 203 to determine the primary performance-related attributes that affect the call center's ability to achieve its operational efficiency and financial goals. The primary attributes are common to most call center operations and include primary skill sets, performance activity metrics, and program eligibility criteria. A process to determine secondary attributes is used to discover other conditions that affect customer contact center operations in addition to the primary conditions. The most significant attributes are used as criteria for the performance-based evaluation and incentive payout.

A primary skill set refers to a group of skills such as: fluency in a foreign language, familiarity with a demographic constituency, knowledge of a particular field of law, product or vendor of a product. All individuals having the same or similar skill sets are grouped accordingly to receive calls from customers that have issues related to matters with which those possessing the skill set can ably assist. The output indicated as X, leading from researching 203 to establishing 205 an appropriate primary skill set, will apply to all individuals in a skill set.

Figure 4A:
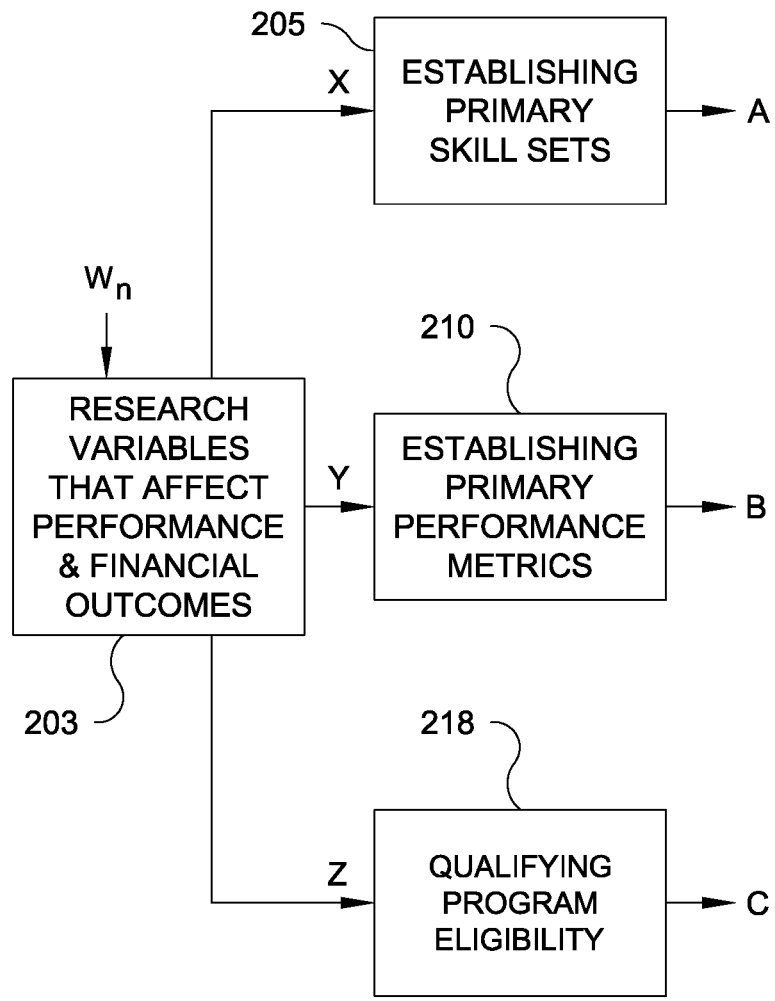
FIG. 4 is a block diagram of a embodiment of the present invention.
Figure 4B:
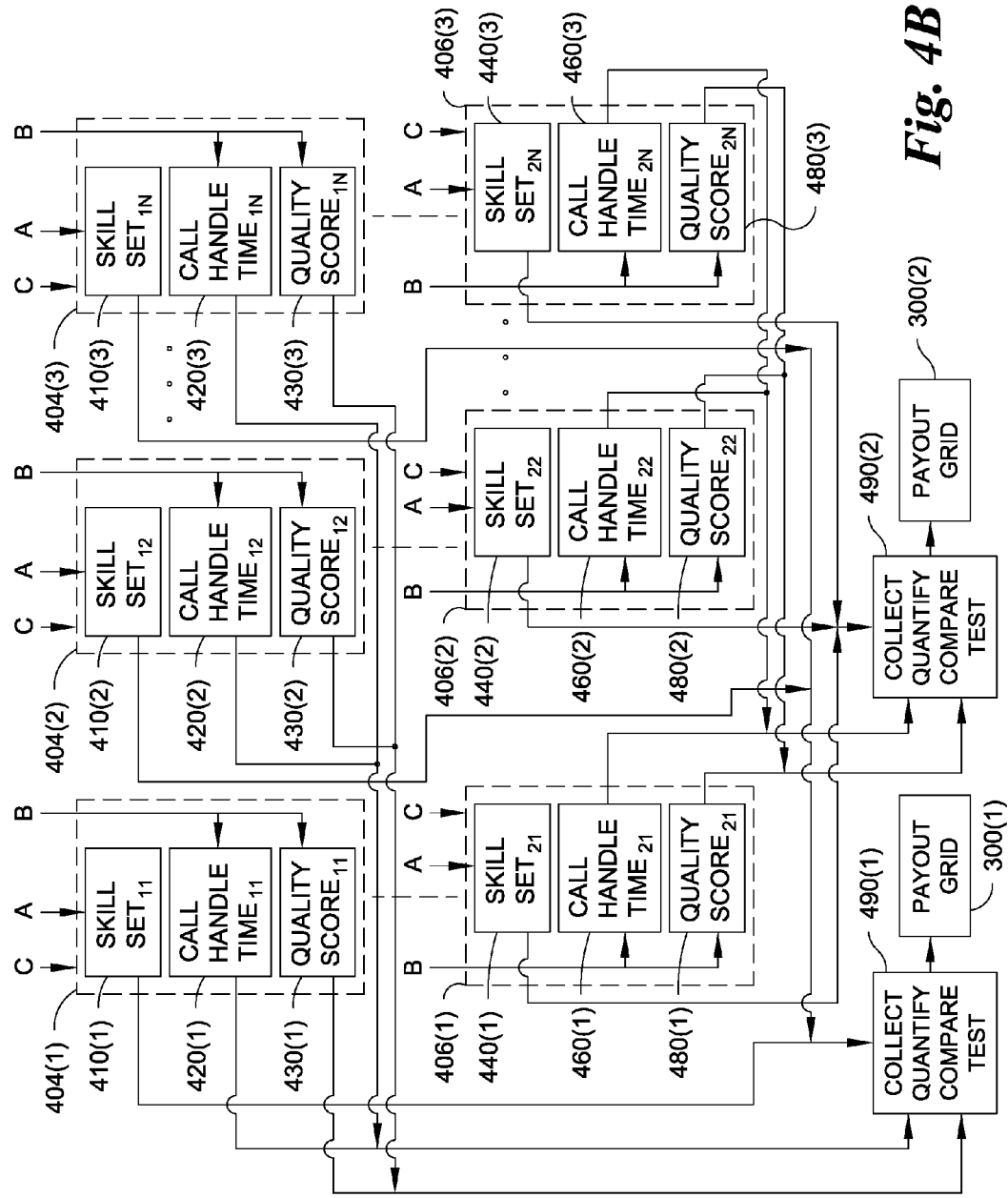

The primary skill set A from step 205 is used in developing 246 a payout grid 300, as more fully described in FIG. 3, which is populated with the actual dollar amounts of the incentive award. Having created a skill set, the next step in creating 220 the target performance standard establishes 210 a primary performance metric. The steps of researching, as shown in FIG. 4, block 203, produce a set of variables Y which reflect the metrics having greatest saliency based upon a determination that they provide the best incentives to produce quality and efficiency in carrying out the call center activities.

In one embodiment, performance metrics are based upon such factors as satisfaction per call, average calling time, courtesy, subject knowledge, and success in handling the customer inquiry improve the efficiency of the call center.

Financial objectives are established by management and are used as drivers, or input to establish the target ranges and the actual payout amounts listed in the grid 300. Once the factors Y, as used in establishing 210 the primary performance metrics to improve the quality and efficiency of the call operation for the particular skill set, have been set, the process incorporates the financial objectives. In setting 215 the financial objectives, such as reducing the cost per call, the payout grid 300 combines the performance standards and other variables, such as are indicated in FIG. 3, and the average call time 305 to produce an incentive payout 310.

In one embodiment, a financial analysis is performed to ascertain the financially related targets. The most significant targets are used as criteria for the awards and are used to populate the payout grid 300. The financial objectives are based upon research input Z, which set the financial objectives 215, which in turn populate C the payout grid 300.

The analysis of performance of the service representative includes monitoring calls received by the service representative and collecting data on the call service representative, as for example recording portions of the call or the entire call end-to-end; transcribing a sequence of events for the recorded calls; identifying call events of interest; analyzing the transcribed calls; quantifying data and calculating parameters corresponding to call effectiveness and establishing financial objectives based at least in part upon information provided to the caller.

Figure 2B:
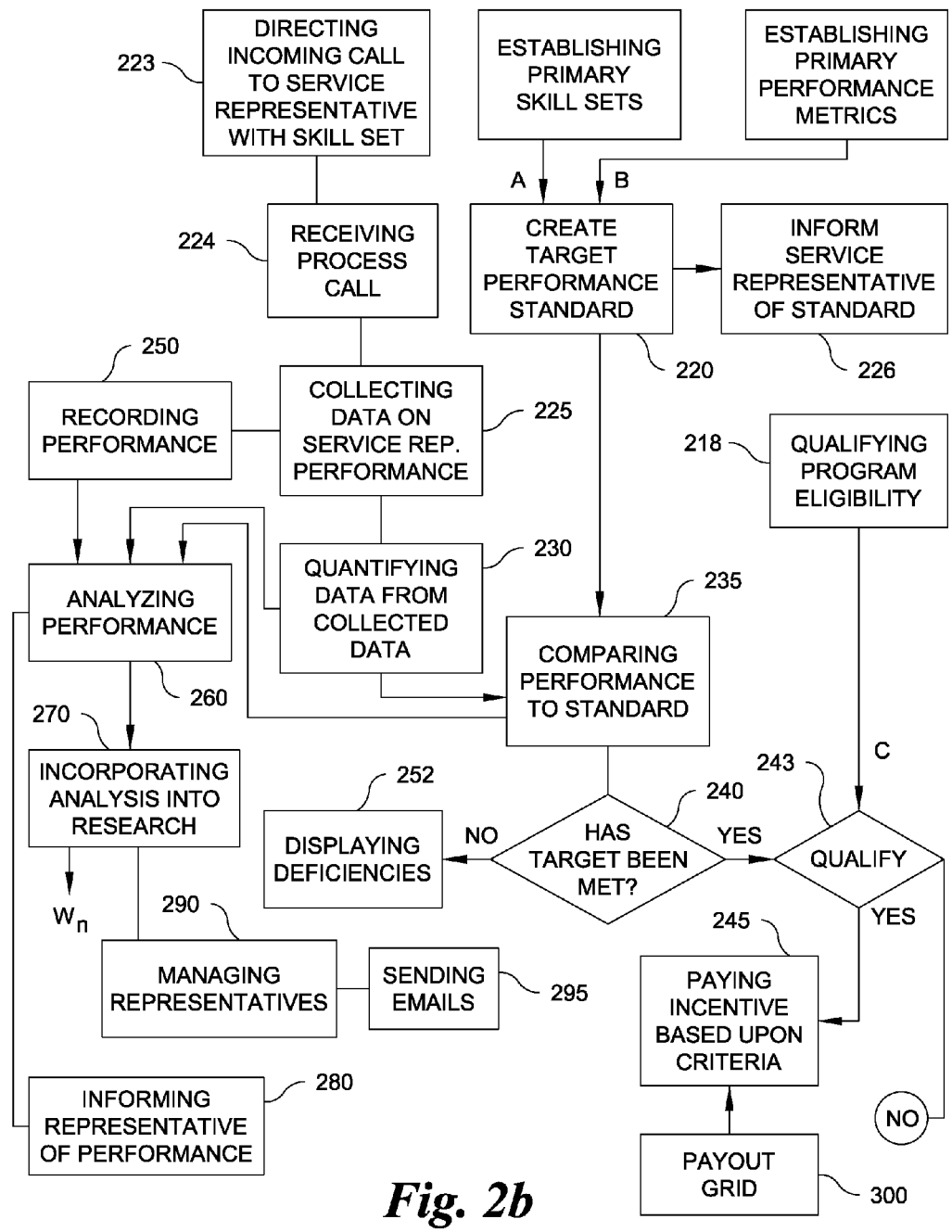
FIG. 2b illustrates a flow diagram of the process for electronically managing an incentive payout for customer service representatives.

FIG. 2b illustrates the steps for directing 223 an incoming customer call, receiving 224 the call and ultimately paying 245 an incentive based upon the payout grid 300. Performance scores are typically based on call efficiency, effectiveness in servicing a customer, quality of advice, and professionalism, such as courtesies extended the caller. Individual scores achieved by customer service representatives are compared to the performance targets. Individuals are rewarded and coached according to the scores achieved. While the service representative is servicing the call, a computer process is collecting 225 information about the call. Information, such as the call itself, may be recorded electronically for later call up by an individual such as a supervisor. A quantifying step 230 prompts an analyst or supervisor to listen or obtain electronic measurements (such as call duration) and based upon a qualitative assessment, the supervisor or analyst converts performance to quantify the service call as to various performance metrics such as satisfaction per call, courtesy, subject knowledge, average call handling time and success in handling the customer inquiry. The quality score is based upon a qualitative assessment, however the telephone call duration is captured electronically (automated) without the intervention of a supervisor. A supervisor can look at the call duration score, but doesn't actually calculate it. Call handling time is calculated separately from the call quality.

Upon quantifying 230, the process compares, in a comparing step 235, the target performance standard created in step 220 and tests whether the standard has been met. The process also tests eligibility by checking whether the representative qualifies for the program in step 243 based upon the qualifying step 218 (See FIG. 4). Qualification includes such information as time keeping information, referencing an attendance record, and generating an attendance score based on a comparison of the time keeping information with the assigned schedule and the attendance record. If the representative qualifies, then in step 245 payment based upon the payout grid 300 is made. If the target 240 has not been met, then the customer service representative is notified through the step of displaying 252 the performance achieved and deficiencies.

The researching 203 of the parameters and factors for establishing 205 the primary skill sets and collecting 210 data based upon researched customer's calls ultimately produce the target performance standards as indicated by step 220. The representative is informed of the target performance grade 223, after which calls from customers are monitored for purposes of collecting data from the activities 225 which are quantified 230.

The communications between the representative and the customer are recorded 250 and analyzed 260. Analyzing 260 considers the actual performance of the representative 225 and the comparison to the standard in step 235. Results are combined and incorporated 270 and fed back into the research step 203 to assess the efficacy of the incentive program, predict trends and to modify the performance attributes and metrics used in the program. The process as embodied allows a call center supervisor to make a periodic review and improve performance by informing 280 service representatives, ranking representatives 290, tracking their accomplishments 290, and reporting the rankings for performance incentives through managing 290 or informing 226 the representative of the standard.

The payout grid 300 is more fully illustrated in FIG. 3. The grid 300 shown, by way of example and not limitation, typically includes two measurement variables. In the example shown a quality score 315 is specified as ranging from >95.0% to 93.0% in various preselected ranges. The ranges may range from 1 percent to 100 percent and are usually chosen by the call center management, although this embodiment of the invention does not preclude any method of choosing the ranges. Although any pertinent measurement variable may be chosen, the example uses the average call time (AHT) as the other variable that will be assessed in determining the payout. In the example, the AHT ranges 330 from <4.80 to 5.05 in various ranges and is, again, typically chosen by the management. The service call representative's performance is determined on the basis of the quality score 315 and the AHT 305 as illustrated. For a given pair of performances, the monetary incentive paid out 310 is the intersection of the two measurement variables. Although the example shows a monetary incentive payout, it will be understood that any incentive may substitute for the payout, such as by way of example, time off, gifts of personal items, educational benefits or any type of incentive that a typical employee might respond to.

FIG. 4 generally shows the payout grid skill set having quality scores 315 and AHT scores and corresponding target ranges 410. In an embodiment of this process, a primary skill set is assigned to an individual representative. Skill sets represent a service representative's knowledge on how to handle a particular type of service call. A primary skill set represents the most significant skill set that an agent possesses to accomplish the assigned task and therefore has a direct influence on performance required to carry out the task. The skill set 410 is used to determine the payout grid 300 that is used to measure an individual's performance against a target payout grid $300_1$ and $300_2$ in order to earn a payout.

In FIG. 4 computer databases $404_{1-3}$ are for managing performance of a customer service representative and have stored therein a skill set $410_{1-3}$ and an associated standard average call time and an associated standard quality score. The computer databases are stored as illustrated in FIG. 1, in one or both database means 170 or database means 150.

The computer databases further have stored therein data resulting from customer contact, data resulting from monitoring calls, data resulting from received by the service representative and data resulting from collecting data on the call service representative; data resulting from transcribing a sequence of events for the recorded calls; data resulting from identifying call events of interest; data resulting from analyzing the transcribed calls; data resulting from quantifying data and calculating parameters corresponding to efficiency of call effectiveness and data resulting from establishing financial objectives based at least in part upon information provided to the caller.

In FIG. 4 the six skill sets data, three of which are represented by database blocks $404_{1-3}$ and three of which are represented by database blocks $406_{1-3}$ are indicative of individual skill sets for individuals at terminals 110a-n (see, FIG. 1) in a call center. In referring to block $404_1$, a skill set $410_1$ having been established in step 205, has an associated standard average call time $420_1$ and a standard quality score $430_1$. Typically the other related skill sets $404_2$ and $404_3$ will have identical standard call handling times $\{(420_2$ and $420_3)\}$ respectively, and standard quality scores $\{(430_2$ and $430_3)\}$. The eligibility of any particular skill set to qualify for the incentive payout based upon the payout grid 300 will be based upon input C as determined in the qualifying 218 step.

In referring to block $406_1$, a skill set $440_1$ having been established in step 205, has an associated standard average call time $460_1$ and a standard quality score $480_1$. Typically the other related skill sets $406_2$ and $406_3$ will have identical standard call handling times ($460_2$ and $460_3$) respectively, and standard quality scores (480 (2) and 480 (3)). The eligibility of any particular skill set to qualify for the incentive payout based upon the payout grid 300 will be based upon input C as determined in the qualifying 218 step.

The call handling time and the quality scores are collected, quantified, compared and tested in blocks $490_1$ and $490_2$ respectively. Following the test, as in testing step 243, either the customer service representative qualifies and is subsequently paid an incentive amount according to the payout grid $300_1$ or $300_2$ respectively, or informed that they did not meet the standard, as established by step 210. A skill set where the variables related to the properties to be measured 302 are utilized in a skill set for an individual to determine the program eligibility criteria 218, determining the payout amounts 310 and determining the target attribute ranges. The attribute ranges 305 are utilized to calculate 330 the criteria per individual. The criteria per individual 330 is used to determine the payout per individual 245.

An embodiment of the present invention permits managing a group of individuals in a skill set by referencing compiled performance scores for individuals in a skill set through accessing the outputs $W_n$ from each service representative in a skill set at step 270, so that, for a plurality of individuals assigned to a skill level. This permits computing a combined score for the skill set group, and plotting a grade scale based upon a plurality of quantitative and qualitative performance measures and displaying of an indication of the grade scale corresponding to the computed combined score for the group.

In FIG. 4, AHT 420 is calculated for the period of payout frequency for an individual. A quality score 430 is also calculated for the period of payout frequency for an individual. The individual is also determined to be either eligible or not to participate in the service incentive program for a payout frequency. Whether an individual qualifies is determined by the qualifying program eligibility 218 step that receives input Z from external sources regarding various matters, such as whether the customer service representative is eligible based upon time in service, and attendance records, among other factors, that management may decide are pertinent from time-to-time. As such, eligibility may be based upon an assessment of professionalism.

An embodiment of the invention includes electronically informing a supervisor by e-mail, or displaying performance scores of a service representative 250 to both the service representative and the supervisor, for purposes of providing a feedback to the service representative. This function, typically in combination with set 290, includes prompting the service representative to interact with the supervisor through the sending 295 of an e-mail or personally meeting the service representative and receiving an acknowledgement, upon which through the operation of the process, the supervisor can track the success or failure of the interaction with the representative to improve performance.

An embodiment of the invention includes the steps for collecting a set of quantitative data generated as a result of customer contact; collecting a set of qualitative data input characterizing service representative performance; generating a performance grade based on the sets of quantitative and qualitative data; determining if the target performance grade based has been met; and if the performance grade has been met, paying the service representative based upon said successful performance grade; and if the performance grade has not been met, displaying the performance grade.

It is understood that as exemplified in FIG. 1, the processor 140, terminals 110, memory 106 and memory with and operating program 106 with functionality selection capabilities can be implemented in hardware, software, firmware, or combinations thereof. In a preferred embodiment, the processor functionality selection, may be implemented in software stored in the memory 106 and memory 104 respectively. It is to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

Further, it is understood that the subject invention may reside in the program storage medium that constrains operation of the associated processors(s), and in the method steps that are undertaken by cooperative operation of the processor (s) on the messages within the signal and data processing network. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD-ROM or via Internet download.

The same is true of computer networks in general. In the form of processes and apparatus implemented by digital processors, the associated programming medium and computer program code is loaded into and executed by a processor, or may be referenced by a processor that is otherwise programmed, so as to constrain operations of the processor and/or other peripheral elements that cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention.

It is expressly intended that all combinations of those elements that perform substantially the same function in substantially the same way to achieve the same results are within the scope of the invention. Substitutions of elements from one described embodiment to another are also fully intended and contemplated.

We claim:

1. A computer method for managing performance of a customer service representative comprising the steps of:
   collecting quantitative data from customer contacts and storing the collected data from customer contacts by the processor in a computer database;
   collecting qualitative data from the service representative's performance and storing by the processor the qualitative data in a computer database;
   collecting quantitative data from the service representative's performance and storing by the processor the quantitative data in the computer database;
   generating by the processor a value of a quantitative performance score based on the quantitative data and a value of a qualitative performance score based on the qualitative data; and,
   paying the representative an incentive financial payout in accordance with a payout grid, the payout grid having a first axis representing values of the quantitative performance score in a plurality of preselected ranges and a second axis representing values of the qualitative performance score in a plurality of preselected ranges, a payout monetary amount being identified at each intersection of the respective preselected ranges.

2. The computer method of claim 1, wherein collecting the quantitative data comprises collecting customer management service information characterizing actions by the representative.

3. The computer method of claim 2, wherein collecting the quantitative data further comprises:
   receiving time keeping information,
   receiving an assigned schedule,
   referencing an attendance target, and
   referencing an attendance score based on a comparison of the time keeping information with the assigned schedule and the attendance target.

4. The computer method of claim 2, wherein collecting the quantitative data further comprises
   receiving call duration information,
   referencing an efficiency target, and
   referencing an efficiency score based on a comparison of the call duration information with the time keeping information and efficiency target.

5. The computer method of claim 1, wherein the collected qualitative data comprises
   a qualitative entry from an individual referencing a qualitative target, and further comprising:
   referencing a qualitative score based on a comparison of the qualitative entry with the qualitative target.

6. The computer method of claim 1, wherein collecting quantitative data further comprises:
   receiving on-line time information;
   referencing an effectiveness target; and
   referencing an effectiveness score based on a comparison of the on-line time information with the time keeping information and effectiveness target.

7. The computer method of claim 1, further comprising plotting a grading scale based upon a compiled plurality of weighted quantitative and qualitative performance measures.

8. The computer method of claim 7, further comprising:
   referencing compiled performance scores for a plurality of individuals assigned to each of a plurality of skill levels;
   computing, for each of the skill levels, a combined score for the plurality of individuals assigned to the skill level;
   plotting a separate grading scale for each of the skill levels based upon a plurality of quantitative and qualitative performance measures; and,
   displaying an indicator upon each of the grading scales corresponding to the computed combined score for each of the plurality of individuals assigned to the skill level corresponding to the grading scale.

9. The computer method of claim 1, further comprising the step of electronically informing an individual of the performance of the service representative.

10. The computer method of claim 1, further comprising one or more of the steps of displaying performance scores of a service representative to an individual or sending an email providing feedback to the service representative.

11. The computer method of claim 10, further comprising:
    prompting a supervisor to make a periodic review,
    informing representatives,
    ranking representatives, and
    reporting the rankings for performance incentive decisions.

12. The computer method of claim 10, further comprising:
    generating performance scores based upon call efficiency,
    generating performance scores based upon effectiveness in servicing a customer,
    generating performance scores based upon quality of advice, and
    generating performance scores based upon professionalism.

13. The computer method of claim 1, further comprising determining a skill set assigned to the representative, and selecting the payout grid associated with the skill set assigned to the representative.

14. The computer method of claim 1, wherein the qualitative performance score is a quality score and the quantitative performance score is an average call time.

15. The computer method of claim 1, further comprising:
    monitoring calls received by the service representative and collecting data on the service representative;
    transcribing a sequence of events for the monitored calls;
    identifying call events of interest; analyzing the transcribed calls;
    quantifying data;
    calculating parameters corresponding to efficiency of call effectiveness and establishing financial objectives based at least in part upon information provided to the caller; and
    using the financial objectives in determining the payout monetary amounts.

16. The computer method in claim 1, further comprising establishing a target performance grade, the establishing of the target performance grade including researching performance factors that influence the success of a call and populating the payout grid with payout monetary amounts dependent on the performance factors.

17. The computer method in claim 16, wherein the payout grid is based upon achievement of primary attributes including primary skill sets, performance activity metrics, and program eligibility criteria.

18. The computer method in claim 17, wherein the payout grid is based upon secondary attributes that affect customer contact center operations.

19. The computer method in claim 17, wherein the primary attributes include a primary skill set including at least one of: fluency in a foreign language, familiarity with a demographic constituency, knowledge of a particular field of law, product or vendor of a product.

20. The computer method in claim 17, further comprising grouping representatives having similar skill sets to receive calls from customers that have issues capable of being addressed by representatives having particular skill sets.

21. The computer method in claim 19, wherein the primary skill set is used in developing the payout grid.

22. The computer method in claim 16, wherein establishing the target performance grade includes establishing a primary performance attribute.

23. The computer method in claim 17, wherein the performance activity metrics are based upon satisfaction per call, average calling time, courtesy, subject knowledge, and success in handling the customer inquiry.

24. A computer system for managing performance of a customer service representative comprising:
   one or more terminals for servicing the customer and for managing, collecting and calculating a combination of performance metrics for the individual customer service representative each having a corresponding processor, which includes a display and a memory; operably connected to a telephone system for receipt of incoming calls;
   a database interconnected to the terminals for storing information related to whether a customer service representative is entitled to an incentive payout, the stored information including quantitative data from customer contacts by the customer service representative, and qualitative data from customer contacts by the customer service representative received from individuals prompted to provide the qualitative data;
   at least one of the corresponding processors being for generating the representative's performance grade based on the quantitative data and the qualitative data and for determining an incentive payout based on a payout grid, the payout grid having a first axis representing values of the quantitative performance score in a plurality of preselected ranges and a second axis representing values of the qualitative performance score in a plurality of preselected ranges, a payout monetary amount being identified at each intersection of the respective preselected ranges;
   an electronic output device for producing documents in at least one of text, graphics, and electronic transfer mode, said output device being interconnected and responsive to each of said plurality of terminals; and,
   a corresponding input device for receiving predetermined input into said processor.

25. The computer system in claim 24 wherein the output device is one of a facsimile machine, printer, or photocopier.

26. The computer system in claim 24 wherein the input device receives data from a server over a global computer communications network, a wide area network, a metropolitan area network, a local area network, a terrestrial broadcast system, a cable network, a satellite network, a wireless network, or a telephone network, or portions and combinations thereof.

27. The computer method of claim 1, further comprising displaying the performance grade and the target performance grade to the representative.

28. The computer method of claim 1, wherein the quantitative data includes average call time.

29. A computer-implemented method for evaluating and rewarding performance of telephone call center performance representatives, comprising:
   storing by a processor in a database in a memory a plurality of skill sets, each of said skill sets having an associated call handling time and quality score;
   storing by the processor in a database a plurality of primary performance metrics;
   ascertaining financial objectives;
   populating, using the financial objectives, a plurality of payout grids, each of the payout grids associated with one of the skill sets, the payout grids employed to determine an amount of an incentive financial payout, the payout grids each having a first axis representing values of a quantitative performance score in a plurality of preselected ranges and a second axis representing values of a qualitative performance score in a plurality of preselected ranges, a payout monetary amount being identified at each intersection of the respective preselected ranges.

30. The computer-implemented method of claim 29, wherein the quantitative performance score is average call time.

31. The computer-implemented method of claim 29, wherein the financial objectives comprise reducing the cost per call.

32. The computer-implemented method of claim 29, wherein one of the skill sets comprises a group of skills including fluency in a foreign language.

33. The computer-implemented method of claim 29, wherein one of the skill sets comprises a group of skills including knowledge of a particular product.

34. The computer-implemented method of claim 29, wherein the performance metrics comprise one or more of satisfaction per call and courtesy.

* * * * *